(12) United States Patent
Mileev

(10) Patent No.: US 11,838,348 B2
(45) Date of Patent: Dec. 5, 2023

(54) SYSTEM AND METHOD FOR IMPLEMENTING ANONYMOUSLY CONSTRAINED COMPUTATION IN A DISTRIBUTED SYSTEM

(71) Applicant: Synergy Solutions Group B.V., Amsterdam (NL)

(72) Inventor: Alexey Mileev, Jurmala (LV)

(73) Assignee: Synergy Solutions Group B.V., Amsterdam (NL)

( * ) Notice: Subject to any disclaimer, the term of this patent is extended or adjusted under 35 U.S.C. 154(b) by 172 days.

(21) Appl. No.: 17/263,321

(22) PCT Filed: Jul. 29, 2019

(86) PCT No.: PCT/NL2019/050503
§ 371 (c)(1),
(2) Date: Jan. 26, 2021

(87) PCT Pub. No.: WO2020/022906
PCT Pub. Date: Jan. 30, 2020

(65) Prior Publication Data
US 2021/0211523 A1  Jul. 8, 2021

(30) Foreign Application Priority Data
Jul. 27, 2018 (NL) ..................... 2021409

(51) Int. Cl.
*H04L 67/01* (2022.01)
*H04L 9/08* (2006.01)
*H04L 67/56* (2022.01)

(52) U.S. Cl.
CPC ............ *H04L 67/01* (2022.05); *H04L 9/0822* (2013.01); *H04L 9/0825* (2013.01); *H04L 67/56* (2022.05)

(58) Field of Classification Search
CPC . H04L 9/0822; H04L 9/0825; H04L 63/0421; H04L 63/0435; H04L 63/0442; H04L 63/0478; H04L 67/01; H04L 67/56
See application file for complete search history.

(56) References Cited

U.S. PATENT DOCUMENTS 7,234,059 B1  6/2007  Beaver et al.
7,512,558 B1  3/2009  Elad et al.
(Continued)

FOREIGN PATENT DOCUMENTS

RU        59288 U1      12/2006
WO    2016200524 A1    12/2016
(Continued)

OTHER PUBLICATIONS

Arai H., Emura K., Matsuda T. (2015) Anonymous Data Collection System with Mediators. In: Ors B., Preneel B. (eds) Cryptography and Information Security in the Balkans. BalkanCryptSec 2014. Lecture Notes in Computer Science, vol. 9024. Springer, Cham. https://doi.org/10.1007/978-3-319-21356-9_10.
(Continued)

*Primary Examiner* — Gil H. Lee
(74) *Attorney, Agent, or Firm* — Hoffmann & Baron, LLP

(57) ABSTRACT

A method of computation executed by a server is provided, wherein constraints on results of the computation from a group of client devices in a distributed system are used in a way that makes it unnecessary to identify the client devices. The constraints from each client device include limit amounts applicable to respective other client devices in the group in combination with the client device. The client devices each form doubly encrypted representations of the limit amounts and send messages with requests and its decryption key to the server. The server doubly decrypts the doubly encrypted representations of the limit amounts using the keys from the messages and determines which pairs of
(Continued)

the messages include description keys that produce verified results. The server computes a solution that satisfies the requests from the messages, subject to the limit amounts from the verified results, applied in conjunction with the requests from said pairs of the messages.

10 Claims, 4 Drawing Sheets

(56) References Cited

U.S. PATENT DOCUMENTS

| | | | |
|---|---|---|---|
| 9,635,000 B1 | 4/2017 | Muftic | |
| 2011/0010563 A1 | 1/2011 | Lee et al. | |
| 2013/0268752 A1* | 10/2013 | Morecki | H04L 63/0428 713/155 |
| 2013/0318339 A1* | 11/2013 | Tola | H04L 67/1095 713/150 |
| 2018/0182048 A1 | 6/2018 | Stöcker et al. | |
| 2018/0316495 A1* | 11/2018 | Wall | H04L 9/14 |
| 2019/0087920 A1 | 3/2019 | Cui et al. | |
| 2019/0295193 A1 | 9/2019 | Winand et al. | |

FOREIGN PATENT DOCUMENTS

| | | |
|---|---|---|
| WO | 2017075755 A1 | 5/2017 |
| WO | 2019070357 A1 | 4/2019 |
| WO | 2019141511 A1 | 7/2019 |

OTHER PUBLICATIONS

Hayashi et al., "Universally Anonymizable Public-Key Encryption", B. Roy (Ed.): ASIACRYPT 2005, LNCS 3788, pp. 293-312, 2005, International Association for Cryptologic Research 2005.

Bellare et al., "Deterministic and Efficiently Searchable Encryption", Advances in Cryptology—CRYPTO '07 Proceedings Lecture Notes in Computer Science, vol. 4622, pp. 535-552, A. Menezes ed., Springer, 2007.

Schipor G.A. (2015) On the Anonymization of Cocks IBE Scheme. In: Ors B., Preneel B. (eds) Cryptography and Information Security in the Balkans. BalkanCryptSec 2014. Lecture Notes in Computer Science, vol. 9024. Springer, Cham. https://doi.org/10.1007/978-3-319-21356-9_13.

* cited by examiner

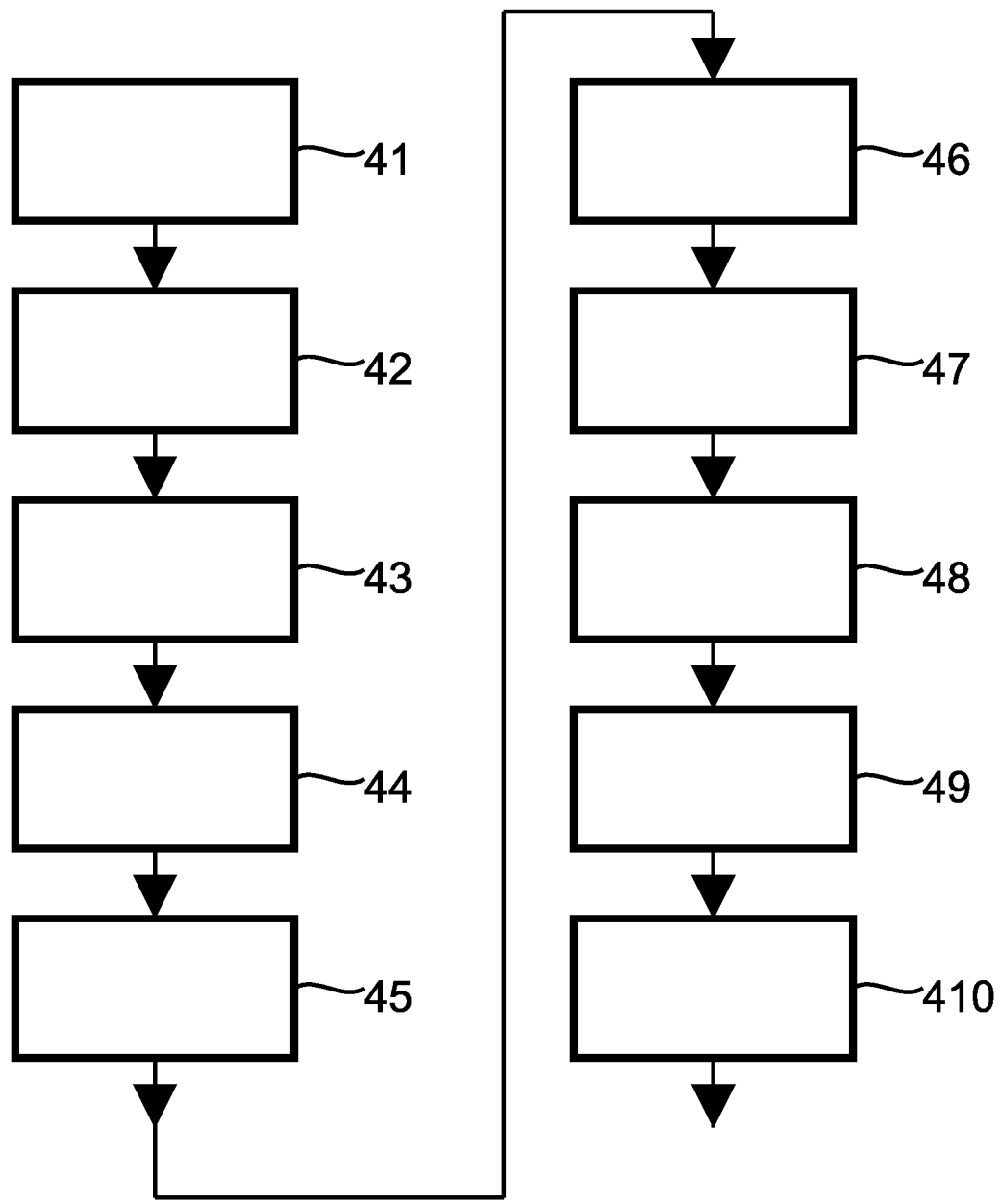

SYSTEM AND METHOD FOR IMPLEMENTING ANONYMOUSLY CONSTRAINED COMPUTATION IN A DISTRIBUTED SYSTEM

CROSS-REFERENCE TO RELATED APPLICATIONS

This application is the U.S. National Phase Application of International Application No. PCT/NL2019/050503, filed on Jul. 29, 2019, and asserts priority to Application No. NL 2021409 filed Jul. 27, 2018, the disclosures of which are hereby incorporated by reference in their entirety.

FIELD OF THE INVENTION

The invention relates to a system and method for implementing anonymously constrained computation in a distributed system.

BACKGROUND

It is known to use a shared server to perform computations in response to combinations of requests from client devices that define constraints on the computation solution. For example, such a computation may involve the allocation of resources from a generally accessible, limited pool of resources, in response to a combination of requests for resources for the client devices. The computation of an optimized solution typically involves determining values of a set of variables that result in the lowest value of a target function that is possible when the values of the variables meet specified conditions. The requests from the client devices define the conditions. In known linear programming methods, the target function is a linear function of the variables and the specified conditions define values or ranges of values of other linear functions of the variables.

Once the solution has been determined in a distributed system, parts of the solution that apply to different client devices, such as information about resources allocated to the client devices, have to be communicated back to the client devices that have sent the requests.

When it is required to keep the information from the client devices confidential, this poses an implementation problem of how the computation can be performed and the result can be distributed to the requesting devices without providing information about the identity of the requesting devices.

Anonymous transmission methods are well known per se. As used herein anonymous transmission refers to transmissions that are performed in a way that makes it impossible to determine the identity of the device that sent the message. For example, anonymous transmission can be realized by using a proxy that forwards the messages to a server without indicating the original sender. However, it should be noted that use of a proxy for this purpose is only one possible embodiment.

The source of the conditions can be made anonymous before the server computes the constrained optimal solution. But this makes it impossible to determine which part of the solution must be sent to which client, unless the results are sent back via a device that anonymized source. In this case the problem is how the server can communicate the parts of the solution to the clients that anonymously supplied the requests, without having the addresses of the client devices.

If it is required to account for client dependent restrictions and anonymity is required, this poses another problem. For example, it may be required to place a restriction on resources that may swapped between clients in the solution. If the server has to be able to operate without information about the identity of the clients that submitted different requests, this poses the problem how the server can determine which restriction it has to apply to which requests in the determination of the solution, without information about the identity of the clients.

U.S. Pat. No. 7,234,059 discloses a method of authenticating that anonymous communications are from members of a group and have not been altered. In an anonymous domain to domain communication protocol of a server, a key is generated and a message is encrypted. The result is encrypted together with the name of the recipient with a public encryption key of the recipient. Upon receipt, the message is decrypted and validated and a revocation token is sent back to the sending domain with a return reply envelope.

SUMMARY

Among others it is an object to provide for ways of implementing anonymously constrained computation in a distributed system that enable the server to perform computations subject to client related limits without requiring information from which the identity of the client can be derived.

A method of anonymously constrained computation, executed by a server dependent on requests from a group of clients in a distributed system is provided, in which method
  each of the clients in the group, referred to as a first client
    forming encrypted representations of limit amounts applicable to respective other clients in the group in combination with the first client, using an encryption scheme to which at least initially only the first client has a decryption key;
    transmitting the encrypted representations of the limit amount applicable to the respective other clients in combination with the first client, each to the respective other client to which the limit amount is applicable;
    receiving encrypted representations of the limit amounts from the other clients; and
    forming doubly encrypted representations of the limit amounts by encrypting the received encrypted representations of the limit amounts received from the other clients that are applicable to the first client that forms the doubly encrypted representations, using the encryption scheme of the first client and/or encryption using a public encryption key of the server;
    sending a message containing a request anonymously to the server, the message containing the decryption key of the encryption scheme of the first client and, at least if the doubly encrypted representations of the limit amounts are formed using the public encryption key of the server, the doubly encrypted representations of the limit amounts;
  the server
    receiving the messages;
    doubly decrypting the doubly encrypted representations of the limit amounts, using the description keys from pairs of the messages and/or, when the message contain the doubly encrypted representations of the limit amounts, using a private decryption key of the server and the description keys from other messages;

verifying results of said double decryption, and selecting pairs of the messages with description keys that produce verified results;

computing a solution that satisfies the requests from the messages, subject to the limit amounts from the verified results, applied in conjunction with the requests from said pairs of the messages.

This makes it possible to apply limits indicated by the limit amounts, e.g. in a linear programming method executed by the server to find an optimized result that satisfies the limits, without using information about the source of the limits. Combination of doubly decrypting of all possible pairs of messages and verifying the results makes it possible to select the pairs of the messages that produce verified results from the possible pairs. In an embodiment, the doubly encrypted representations of the limit amounts may be sent to the server separately from the messages. In another embodiment they may be included in the messages.

In an embodiment a method is provided wherein the first clients each
- include an encryption key to which encryption key initially only the first client has a decryption key in the message containing the request;
- receive broadcasts of encrypted parts of the solution from the server; and
- decrypts the encrypted parts using the decryption key for the encryption key in the message; and
- determines which encrypted part results in a verified decryption result;

and the server
- forms the encrypted parts of the computed solution that encrypt respective parts of the computed solution that apply to respective ones of the requests, each encrypted part of the computed solution being encrypted using the encryption key included in the message containing the respective one of the requests; and
- broadcasts the encrypted parts of the computed solution to the clients.

This makes it possible compute and distribute the requests without using information about the sources of the requests.

BRIEF DESCRIPTION OF THE DRAWING

These and other objects and advantageous aspects will become apparent from a description of exemplary embodiments, with reference to the following figures.

FIG. 4 shows a flow chart of an anonymous optimization method

DETAILED DESCRIPTION OF EXEMPLARY EMBODIMENTS

Figure 1:
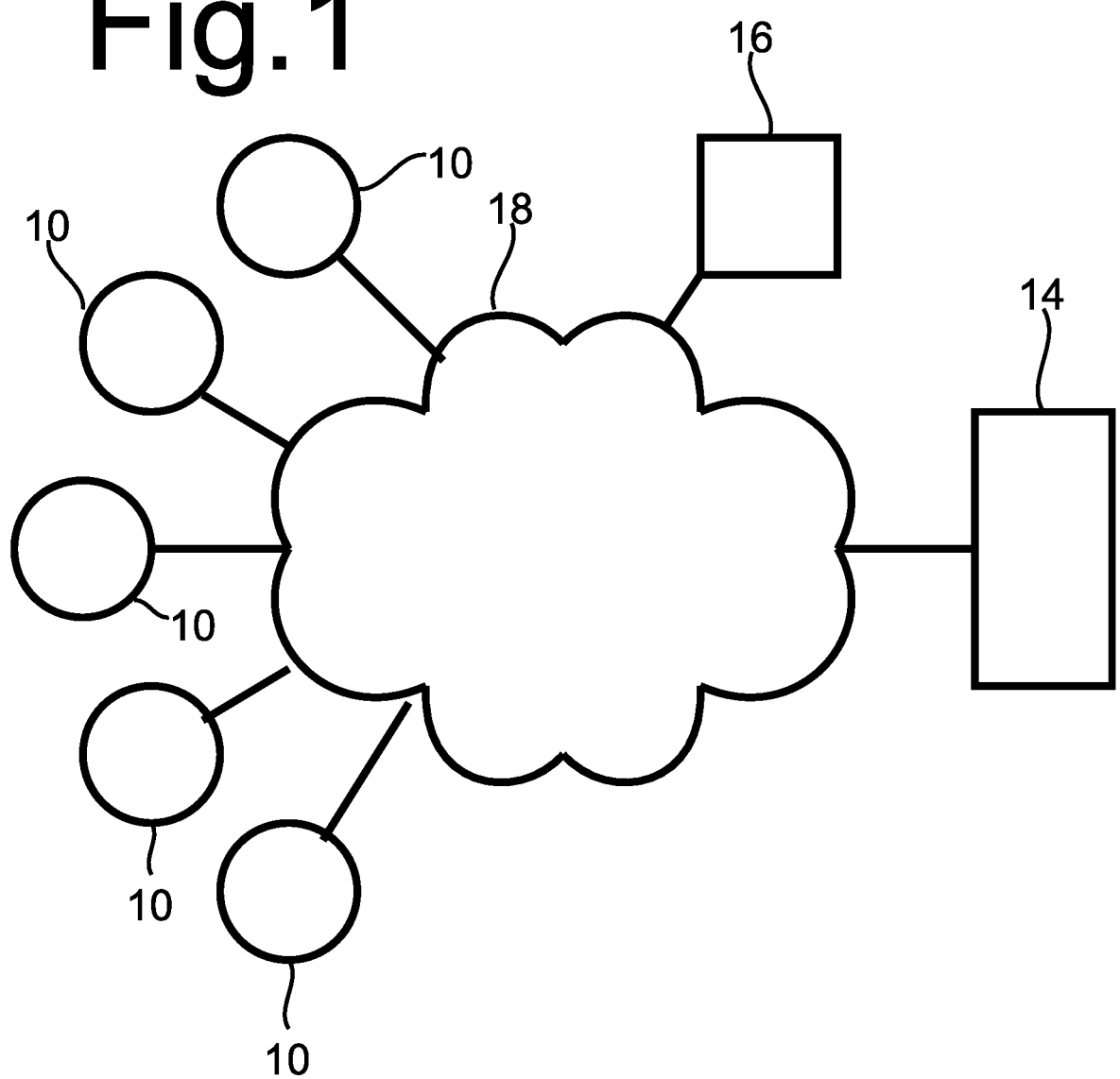
FIG. 1 shows a network system

FIG. 1 shows a network system comprising a plurality of first client devices 10, a server 14 and a proxy 16 coupled by a network 18. Server 14 may comprise a server computer and a physical storage device that stores a program of instructions for the server computer to make the server computer perform the methods that will be described. Alternatively, the physical storage device may be configured to provide the program to a cloud server.

Server 14 computes a solution of a constrained optimization problem, using constraints defined by requests from first client devices 10. Typically, a constrained optimization problem involves a number of variables, a function that directly or indirectly depends on these variables, and a number of constraints that must be satisfied by the combination of values selected for the variables. The function is usually referred to as the cost function. The solution of the constrained optimization problem is a set of values of the variables that satisfy the constraints and minimize the value of the cost function. An often used embodiment of a constrained optimization problem is a linear programming problem, wherein the constraints can be expressed as values that must be assumed by linear combinations of the variables, or threshold values for such linear combinations. In linear programming problems, the cost function also includes a linear combination of variables. Alternatively, constrained non linear optimization or other search algorithms may be used that search for a solution satisfying constraints received from a combination of first client devices.

Gas Pipeline Network Example

Figure 3:
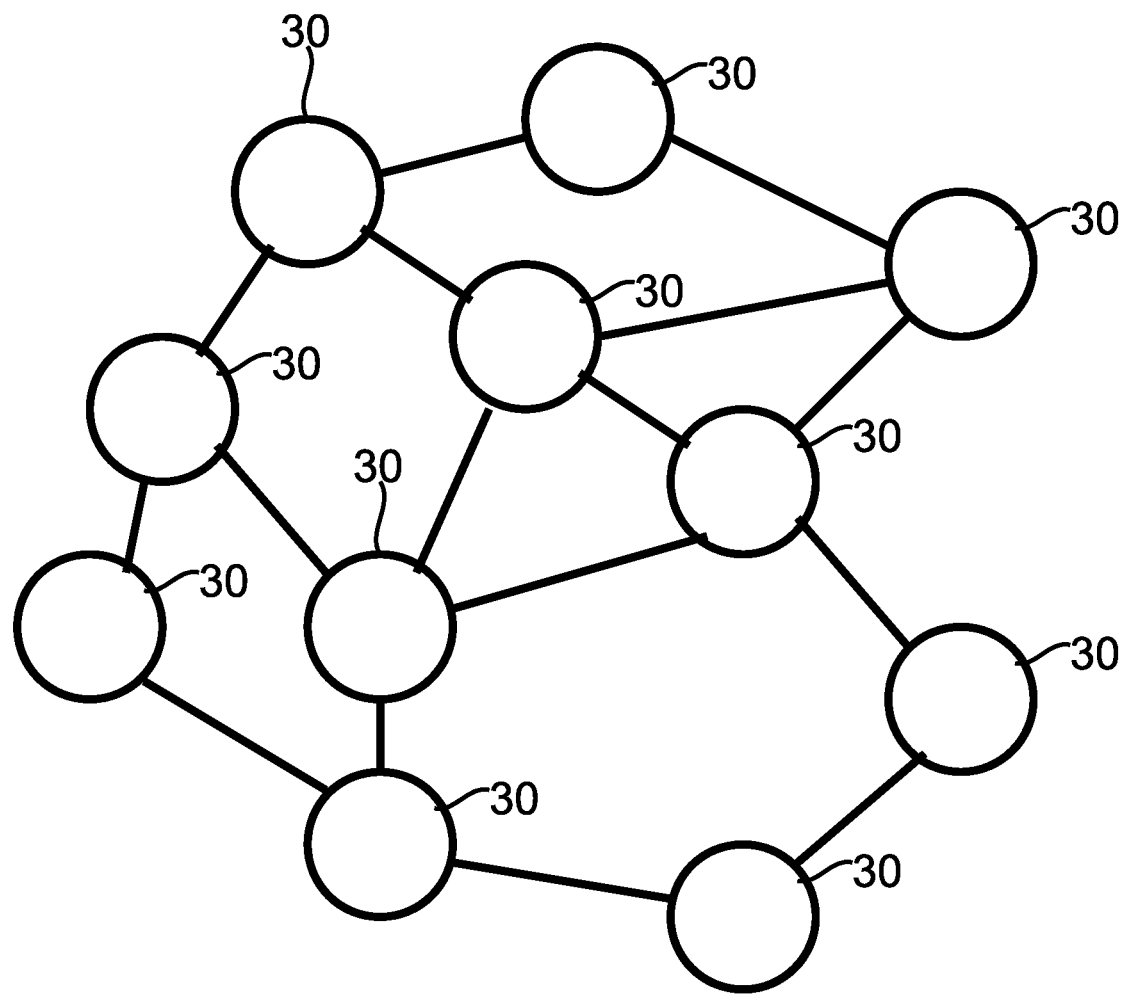
FIG. 3 shows a gas pipeline network

By way of example, reference will be made to a method of allocating transport capacity through a gas pipeline network, as shown in FIG. 3, which contains a plurality of hubs 30 or hubs (sub-networks) and pipelines 32 connecting pairs of hubs 30. By way of example the problem will be described with reference to hubs 30, but this description equally applies when hubs 30 are replaced by network terminals. Pipelines 32 directly connect only some pairs of hubs 30 in the network, so that transport between an arbitrary pair of hubs 30 usually involves use of a path through a series of pipelines. For most pairs there will be may different paths that can be used to transport gas between the hubs 30 of the pair.

When a pipeline "p" transports a amount of gas $W(p)$ during a time unit (e.g. during one day) this removes the amount of from one hub "t" and adds that amount of gas at another hub. This can be expressed in terms of a change $D(t)$ in the amount at t where $D(t)=$sum of $S(p, t)*W(p)$ where $S(p,t)$ expresses the pipeline connection. $S(p,t)$ is plus one when t is one of the pair of hubs that are directly connected by p, $S(p,t)$ is minus one for the other connected hub of the pair and zero for the remaining hubs. Herein $D(t)$ and $W(p)$ can be positive or negative.

Each pipeline 32 between a pair of hubs 30 is associated with one or more capacity limits that express a maximum amount of weight $Wmax(p)$ of gas that can be transported per time unit (e.g. one day) between the hubs 30 of the pair: $|W(p)|<Wmax(p)$. Thus the transport of gas through each pipeline 32 in a time unit is a resource of which only a maximum amount of resource is available. Alternatively, maximum and minimum amounts may be associated with a pipeline: $Wmin(p)<W(p)<Wmax(p)$. This may used to express a requirement of one way only transport by putting $Wmin(p)=0$ or $Wmax(p)=0$.

When an amount of gas W has to be transported between an arbitrary pair of hubs 30 during a specified time unit, one or more paths have to be allocated for all or part of the amount W during that time unit. When a combination of a plurality of amounts of gas has to be transported between a plurality of pairs during the time unit, allocations are needed for all of these amounts, and the allocations of the paths have to meet constraints that the a maximum amount of weight in the different pipelines 32 is not exceeded. Furthermore, the allocations should minimize a function (usually referred to as cost criterion) e.g. in terms of a sum over the pipelines p of the amount of gas transported through the pipelines. Thus, the allocation of paths involves resource allocation. The computation of this resource allocation is performed by server 14.

In the gas pipeline network allocation example, the requests R(n) from a each first client device "n" may specify a set of values W(n, t) representing amounts of gas to be supplied to or taken from respective hubs "t" in the solution of the optimization. Positive values of W(n, t) may be used to express supply to the hub t, and negative values of W(n, t) may be used to express taking out gas from the hub. The amounts W(n, t) may express a weight of gas or a volume of gas at a predetermined pressure and temperature etc. If need be, the request may also contain information that indicates the time unit to which the request applies.

In another representation, requests R(i, n)=(W(i, n), A(i, n), B(i, n)) may specify a target amount of resources W(i, n) for a time unit in response to the request R(i, n) and the target hubs 30 A(i, n), B(i, n) between which this amount needs to be transported. In other words, such request specifies that a weight W(i, n) will need to supplied to a station A(i, n), and a weight W(i, n) will need to be taken out from station B(i, n). This will generally require allocations of pipeline capacities of pipelines along a route, or routes, between hubs 30 A(i, n), B(i, n). A collection of requests R(i,n) from the same client "n", may be expressed as set of values W(n, t) representing amounts of gas to be supplied to or taken from a hub "t", as described in the preceding. In the following, requests that specify a set of values W(n, t) will be used, but it should be noted that requests R(i, n)=(W(i, n), A(i, n), B(i, n)) may be used instead, since the former can be derived from the latter.

In the gas pipeline network allocation example, server 14 computes a set of values V(p,n) representing amounts of gas transported through pipelines "p" in response to the requests from first client devices 12. Optionally, the sign of the amount V(p,n) can be used to represent the direction of flow through the pipeline p.

Server 14 computes a set of this type that minimizes the cost criterion, such as the total amount of transported gas, subject to the conditions that the set of allocations enables the requests and does not involve using more than the maximum amount of weight in the different pipelines 32 during the time unit. The condition that the allocation does not involve using more than the maximum amount of weight in the different pipelines 32 during the time unit can be expressed mathematically by the requirement that for each pipeline p the sum over all first client devices, n, of V(p,n) must be within the specified capacity of the pipeline.

The condition that the set of allocations enables the requests expresses conservation of gas at the hubs. For each hub t and the combined requests from each first client device n:

Sum over pipelines $p$ of $S(p,t)*V(p,n)=W(n,t)$+sum over $m$ of swap $(n,m,t)$

Herein swap(n,m,t) is an amount of gas that is swapped between requests from first client device n and m. Conservation of gas is expressed by requiring that swap(n,m,t)=−swap(m,n,t).

Any type of cost criterion to be optimized may be used, e.g. the cost criterion may be the total amount of transported gas in all pipelines, or a weighted sum of this amounts in different pipelines, or a weighted sum of such amounts and other factors such as the absolute values of the swap values, possibly weighted by weight factors that differ for different hubs etc. In an embodiment, the cost criterion may be a sum of cost functions C(n) for different first client devices, or the cost criterion may be a sum of a general cost function and cost functions C(n) for different first client devices. Cost functions C(n) may be used that depend in a predetermined way on the V(p,n) and swap(n,m,t) amounts. E.g. C(n)=sum over p of V(p,n) or a sum overt and m of a function F(swap(n,m,t)) of swap(n,m,t), or combinations of such sums. Weighted sums may be used. In another embodiment, the request may include definitions of the functions C(n) to be used.

In an embodiment, further conditions may be imposed in the requests, such as minimum gain thresholds requiring C(n)>T(n) where T(n) is a threshold dependent on the requested amounts W(n,t).

Communication of Computation Results

Figure 2:
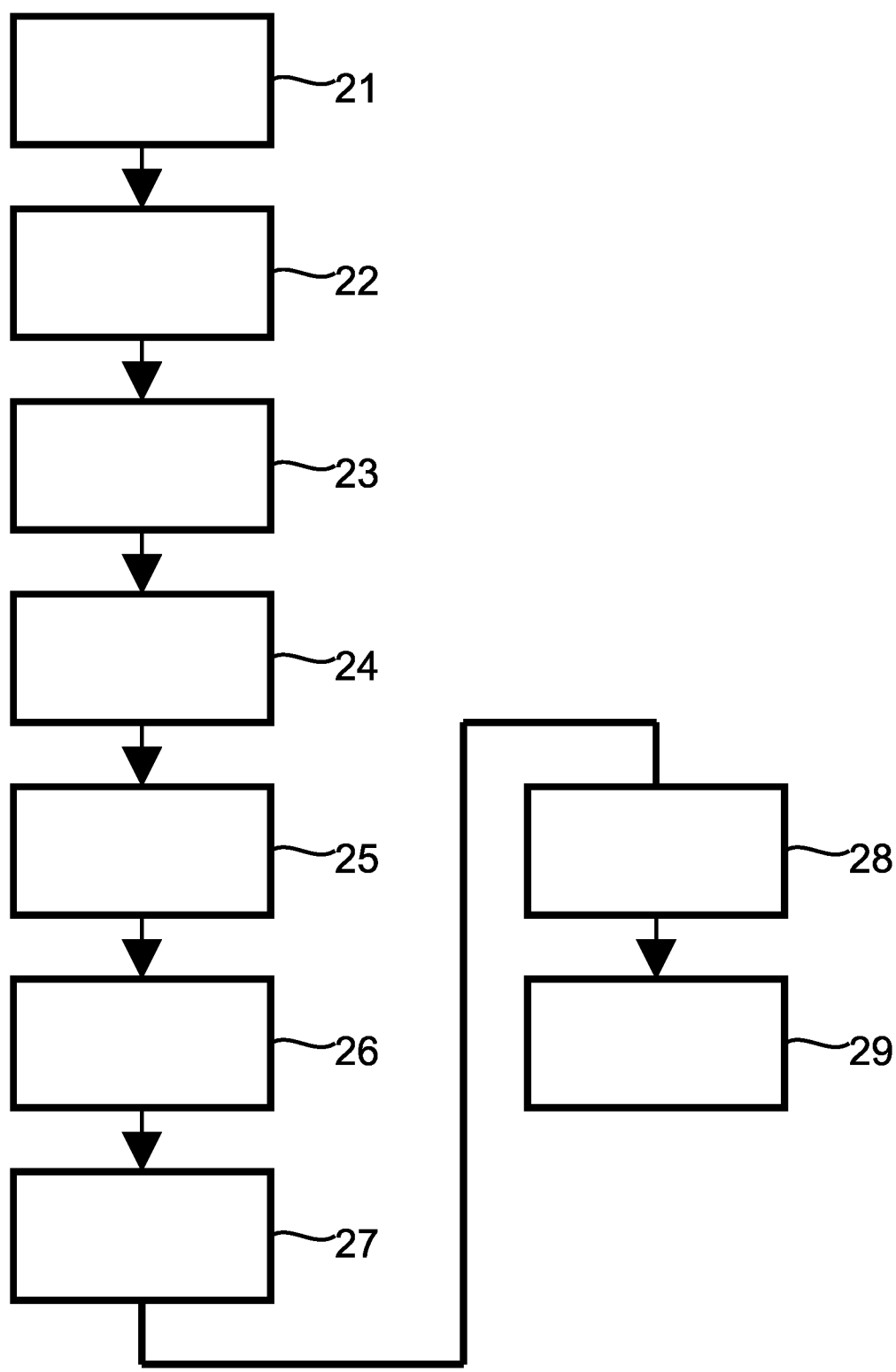
FIG. 2 shows a flow chart of an anonymous optimization method

FIG. 2 shows a flow chart of a method performed by the network system. In a first step 21, first client devices 10 transmit messages M(n) containing requests R(n) specifying amounts W (the index "n" is used to distinguish different first client devices 12). If first client devices 10 send more than one request, without collect their requests in a single message, an additional "i" may be needed to identify the messages M(i,n) and requests R(i,n). In general a request specifies one or more conditions that have to be fulfilled in the solution of an optimization problem. In an embodiment a request may include an explicitly specified amounts W of one or more resources U that need to be allocated.

Furthermore, first client devices 10 add an encryption key K(n) to each message M(n). It should be noted that the key K(n) is contained in the message but not used to encrypt it. Preferably, different keys are used for different messages sent by the first client device 10 for different optimization, such as optimizations for different time intervals. Preferably, the encryption key K(n) is the public key K of a public-private key pair, of which the first client device 10 retains the private key. A public-private key pair may be generated specifically for each request.

In an embodiment, each first client device 10 uses a further public key Ks of a public-private key pair of which server 14 has the private key. In this embodiment the first client device encrypts the request R(n) and the encryption key K(n) of the message M(n) to form an encrypted version E(R(n), K(n); Ks) of the request R(n) and the encryption key K(n) encrypted with the key Ks. In this embodiment, K(n) may be a key of a symmetric encryption scheme, in which this key is used for both encryption and decryption (in a symmetric encryption scheme the decryption key and the encryption are equal, e.g. secret random number). The first client devices 10 transmit messages M(n) containing this encrypted information to proxy 16.

In a second step 22, proxy 16 anonymously forwards the messages to server 14, i.e. proxy 16 makes it impossible to determine the identity of the first devices 10 that sent the messages. Anonymous forwarding is known per se. Use of a proxy 16 for this purpose is only one embodiment.

In a third step 23, server 14 receives the messages. In the embodiment wherein the messages have been encrypted with the public key Ks of the public-private key pair of which server 14 has the private key, server 14 decrypts the messages using this private key.

In a fourth step 24, server 14 computes a solution of an optimization problem subject to the condition that the solution complies with the combination of the requests from the first client devices. For example, the solution may provide for the allocation of the requested resources for a time unit based on the request. In the gas pipeline network example, the solution defines values of V(p,n) and swap(n,m,t) that optimize the value of the optimization criterion subject to the conditions defines by the request.

The gas pipeline optimization problem as described is an example of a linear programming problem. The computation of the solution of the optimization problem subject to the combination of the requests from the first client devices can be performed by means of a linear programming algorithm. Linear programming algorithms are well known per se: they provide for the determination of the values of a plurality of variables that realize an optimum of a function that is a linear combination of the variables, subject to conditions that express linear relations between the variables.

The solution may define allocation of resources in response to requests from first client devices. But as noted, the gas pipeline network allocation is used as an example of optimization problems in general that depend on combinations of requests from different first client devices. The general point to note is that the resulting optimized values (e.g. resources allocations such as allocations of transport amount in different pipelines 32) to requests requires access to all of the requests to ensure that the conditions from the requests are met and limits such as the maximum available resources are not exceeded by the solution.

In a fifth step 25, server 14 encrypts parts X(n) of information from the solution using the keys K(n) provided with the requests R(n) into encrypted solution information. Preferably, for each part X(n) of information from the solution, a combination of verification information and information from the solution is encrypted into the encrypted solution information with the key K(n) provided with the request R(n) to which the part X(n) of information from the solution applies. The verification information is provided to make it possible to verify after decryption whether the decryption was successful. Methods of providing verification information are known per se. The verification information may simply be a predetermined code word that is encrypted together with the part X(n) of information from the solution, so that the presence of this word can be verified after decryption, or a checksum of the part X(n) of information from the solution, the checksum being is encrypted together with the part X(n) of information from the solution etc.

In the gas pipeline network allocation example, the part X(n) of information from the solution for a first client device "n" may represent amounts of gas V(p,n) to flow through respective pipelines "p" and information (e.g. implicit or explicit index values or encryption keys K(m)) distinguishing anonymous other first client devices "m" and hubs "t" and amounts swap(n,m,t) of gas swapped with the other first client devices "m" at hubs "t". Preferably, the part X(n) also contains the encryption keys K(m) of the other client devices to distinguish the other first client devices. Server 14 may form the encrypted part of information from the solution I(n)=E(X(n),V; K(n)) for each request R(n), using the encryption key K(n) provided with the request R(n) to encrypt the part X(n). Herein V is the verification information.

In a sixth step 26, server 14 broadcasts the encrypted parts X(n) of information from the solution for all requests. For example, server 14 may place the encrypted information for all requests into a block chain.

In a seventh step 27, each first client device 10 receives the encrypted part X(n) of information from the solution for all requests and filters the results. The filtering comprises trying to decrypt the encrypted the part X(n) of information from the solution from all encrypted parts and using decryption keys K(n) associated with the request R(n) from that first client device 10. When the decryption key K(n) provided with a request is the public key of a public-private key pair, first client device 10 uses the private key of the pair that the first client device 10 has retained. After applying decryption, the first client device 10 verifies whether the decryption result contains correct verification information. If not, first client device 10 filters out the result. In this way the filtering in each first client device 10 produces the part X(n) of information from the solution that contains results for the requests sent by that first client device 10.

In the gas pipeline network allocation example, first client device 10 thus obtains the information part X(n) representing amounts of gas V(p,n) to flow through pipelines "p", information distinguishing anonymous other first client devices "m" and amounts swap(n,m,t) of gas swapped with the other first client devices "m" at hubs "t" and amounts swap(n,m,t) of gas swapped with other client devices "m" at Hubs "t" in response to the request R(n).

An alternative way to communicate the information parts X(n) would be for proxy 16 to keep information about the addresses of the first client devices 12 that have send requests in relation to the anonymized requests, to send back information parts X(n) from server 14 to proxy 16 identifying the numbers "n" to which the information parts related and to send back the information parts to first client devices 12 using the addresses from which the requests were sent. In some cases, this may provide acceptable anonymity, but it increases the risk of information leaks.

Client Pairing

To execute the swaps, it may be needed to determine the identity of the first client devices "m" involved in the swaps swap(n,m,t) in the computation result. In an embodiment this may be done by a central counter party computer (not shown) or by first client devices themselves. In the central counter party computer embodiment, first client devices 12 send the decrypted information parts to the central counter party computer, together with an identification of the first client devices 12. Thus, the central counter party computer obtains identifications of the first client devices 12 involved in the swaps. The central counter party computer pairs the identification different client devices 12 in the swap and handles the swap.

In the embodiment wherein first client devices 10 themselves perform the pairing, an optional eight step 28 and ninth step 29 may be executed. In eight step 28 each client device "n" encrypts the swap values swap(n,m,t) with different client devices "m" with encryption keys of the different client devices "m" respectively, together with verification information, and broadcasts the encrypted swap values. In an embodiment, the same encryption keys K(m) may be used as for transmission from server 10, which may be included in the information parts from server 14, but alternatively other encryption keys K(m) may be used.

In ninth step 29 the client devices further filter the results. The further filtering comprises trying to decrypt the encrypted swap values using decryption keys K(n) associated with the request R(n) from that first client device 10. After applying decryption, the first client device 10 verifies whether the decryption result contains correct verification information. If not, first client device 10 filters out the result. In this way the further filtering in each first client device "m" produces the swap values swap(n,m,t) involving the first client device "m" and the first client device "n" that transmitted the encrypted swap values.

In this way, the first client devices are able to obtain the parts of the optimization results that apply to them in combination with identified other first client devices, even though the computation of the optimization results is computed anonymously.

Client Pair Dependent Limits

Another implementation problem is posed if it is required to use conditions on the optimal solution that can relate differently to different requests.

In the gas pipeline network allocation example, it may be desirable to impose different limits on the amount of gas that may be swapped between requests from different first client devices 10. The different client devices 10 could specify such limits for each other. For example, each first client device 10, labeled "n", may specify limit amounts L(n,m) on the amounts of gas that it will want to exchange with other first client devices 10, labeled "m".

FIG. 4 shows a flow chart of a method performed by the network system that makes such a computation possible. In this method, multiply encrypted limit values for different resources are associated with the requests, e.g. by including them in the requests. Different first keys K1n associated with respective different first client devices 10 (labeled by n) are used to encrypt the limit values.

Although this method will be described in the context of communication similar to that of the flow chart of FIG. 2, it should be appreciated that the method disclosed in FIG. 4 can also be applied outside this context. As noted alternative way of communicating results exist, for example when there are no anonymity requirements for the communication, or when less stringent anonymity requirements are imposed. Even such circumstances without strict anonymity of the result, the implementation problem caused by conditions that can relate differently to different requests, such as limits relating to pairs of first client devices, can be solved.

In a first step 41, each first client device 10, labeled "n", encrypts representations of amounts, corresponding to limit amounts L(n, m) for respective other first client devices 12, labeled m, together with verification information V', using its respective first key $K1_n$. When first client device 10 does not impose any limit amount for another first client device 12, this may be represented in the representation of the amount. The first client device 10 transmits the encrypted representations of amounts $E(L(n,m)+V';K1_n)$ to the respective other first client devices 12.

In a second step 42, each first client device 10, labeled m, receives the encrypted representations of amounts $E(L(n,m)+V';K_n)$ from the first client devices 10, labeled n, and encrypts the encrypted representations of amounts using its respective first key $K1_m$. The resulting doubly encrypted representations of amounts $E(E(L(n,m)+V;K1_n);K1_m)$ are transmitted anonymously to server 14.

In a third step 43, similar to the first step 21 of FIG. 1, first client devices 10 transmit messages M(n) containing requests R(n) for amounts of resources to proxy 16. In this embodiment, a first decryption key $K1_n'$ corresponding to the first encryption key $K1_n$ of the client device n is included in the message. Decryption keys of public-private key pairs, or secret keys of symmetric encryption schemes may be used.

Subsequently, server 14 executes a sixth step 46 to determine limit amounts corresponding to combinations of requests R(n), R(m). These limit amounts correspond to the limit amounts L(n, m) for pairs of first client devices 12 n,m. But server 14 does not need to identify these first client devices 12 n,m. Instead, server 14 uses pairs of the first decryption keys $K1_n'$ from pairs of the requests Ri, Rj to try and decrypt the doubly encrypted representations and verifies whether the decryption result contains correct verification information. Because the first keys $K1_n$ associated with different first client devices 10 are different, the decryption of each doubly encrypted representation produces a verified result only with the first decryption keys $K1_n'$ from one pair of requests R(n), R(m). Server 14 uses the amount from the decrypted representation from the verified result as a limit amount for that pair of requests R(n), R(m).

In a seventh step 47 corresponding fourth step 24 of FIG. 2, server 14 computes an optimum solution of the requested resources for a time unit based on the request, subject to the limit amounts for the pairs of requests R(n), R(m). Server 14 may take the limit amount into account in the condition that the solutions enables the requests. Optionally, server 14 may use default limit values for pairs for which no verified limit values are found (e.g. zero values limits). In the gas transport example this condition can be expressed by the requirement that the sum over hubs "t" of swap values swap(n,m,t) is less than L(n,m).

After seventh step 47 the method of FIG. 4 may proceeds like the method of FIG. 2, with steps 48, 49, 410 corresponding to fifth to seventh steps 25-27 of the method of FIG. 2, wherein server 14 encrypts information from the allocations and broadcasts the encrypted part X(n) of information from the solution for all requests. However, these steps are not always necessary, e.g. they may not be needed if anonymous distribution of the result is not needed or if proxy 16 is used to return the results. Finally, each first client device 10 receives the encrypted the part X(n) of information from the solution for all requests and filters the results.

Although an example has been described that uses an asymmetric encryption with distinct encryption and decryption keys, it should be noted that, when the requests themselves are encrypted with a public key of server 14, asymmetric encryption may be used, wherein the first decryption keys $K1_n'$ of a client equals the first encryption key $K1_n$ of that client.

Although specific embodiments have been described, it should be appreciated that alternative embodiments are possible. For example, the first client device 10, labeled m, may not need to encrypt the received encrypted representations of amounts $E(L(n,m)+V';K_n)$ from the first client devices 10, labeled n. Instead, the first client device 10 m may include these encrypted representations of amounts $E(L(n,m)+V';K_n)$ in the request message M(m) from that first client device 10, and encrypt this message M(m) with a public key of server 14 in third step 43.

In that case server 14 may determine limit amounts when it executes sixth step 46, using the information that the encrypted representations of amounts $E(L(n,m)+V';K_n)$ in the message M(m) apply to the request R(m) in that message M(m). Thus, server 14 only needs to use the first decryption keys $K1_n'$ from other requests to try and decrypt the encrypted representations of amounts $E(L(n,m)+V';K_n)$ and verify whether the decryption result contains correct verification information. When the result is verified with the decryption key from a message M(n), server 14 may use the amount from the decrypted representation from the verified result as a limit amount for the pair of requests R(n), R(m). Optionally, server 14 may use default limit values for message pairs for which no verified limit values are found (e.g. zero values limits).

The invention claimed is:

1. A method of performing computations by means of a distributed computing system that comprises a server, a group of clients, and a communication network that provides for encrypted, anonymous communication between the clients in the group of clients and from individual clients in the group of clients to a server, the method comprising:

each of the clients in the group, referred to as a first client forming encrypted representations of limit amounts applicable to respective other clients in the group in combination with the first client, using an encryption scheme to which at least initially only the first client has a decryption key, wherein the limit amounts are amounts of value;

transmitting the encrypted representations of the limit amounts applicable to the respective other clients in combination with the first client, each to a respective other client to which a limit amount is applicable;

receiving encrypted representations of the limit amounts from the other clients; and forming doubly encrypted representations of the limit amounts by encrypting the encrypted representations of the limit amounts received from the other clients that are applicable to the first client that forms the doubly encrypted representations, using the encryption scheme of the first client or encryption using a public encryption key of the server;

sending a message containing a request anonymously to the server, without having an address of the first client, the message containing the decryption key of the encryption scheme of the first client and, if the doubly encrypted representations of the limit amounts are formed using the public encryption key of the server, the doubly encrypted representations of the limit amounts;

the server receiving messages from the clients in the group referred to as first clients;

performing double decryption of the doubly encrypted representations of the limit amounts, using decryption keys from pairs of the messages or, when the message contains the doubly encrypted representations of the limit amounts, using a private decryption key of the server and the decryption keys from other messages;

verifying results of the double decryption, and selecting pairs of the messages with decryption keys that produce verified results; and computing a solution that satisfies requests from the messages, subject to the limit amounts from the verified results, applied in conjunction with the requests from the pairs of the messages.

2. The method according to claim 1, the method further comprising each of the first clients including, in the message containing the request, an encryption key to which encryption key initially only the first client has a decryption key;

receiving broadcasts of encrypted parts of the solution from the server; and decrypting the encrypted parts using the decryption key for the encryption key in the message; and determining which encrypted part results in a verified decryption result; and the server forming the encrypted parts of the computed solution that encrypt respective parts of the computed solution that apply to respective ones of the requests, each encrypted part of the computed solution being encrypted using the encryption key included in the message containing a respective one of the requests; and broadcasting the encrypted parts of the computed solution to the clients.

3. The method according to claim 2, wherein the server transmits encryption keys in association with respective sub-parts of the respective parts of the computed solution that also relate to other ones of the first clients, each of the first clients encrypting the respective sub-parts of the verified decryption results with the encryption keys of the other ones of the first clients respectively;

broadcasting the encrypted respective sub-parts, identifying the first clients that broadcast the encrypted respective sub-parts;

decrypting the broadcasted encrypted respective sub-parts using the decryption key for the encryption key in the message; and determining which encrypted sub-part results in a verified decryption result.

4. The method according to claim 1, wherein the first clients include verification information in the doubly encrypted representations of the limit amounts and the server verifies the doubly encrypted representations by testing whether results of the double decryption include the verification information.

5. The method according to claim 2, wherein the server includes verification information in the parts of the computed solution and the first clients verify that the parts of the computed solution include the verification information.

6. The method according to claim 1, wherein the first clients transmit the doubly encrypted representations of the limit amounts applicable to the requests in the messages that contain the requests.

7. The method according to claim 1, wherein the first clients encrypt the messages using a public encryption key of the server.

8. A method of allocating gas pipeline transport capacity, using anonymous distributed resource allocation computation according to the method of claim 1.

9. A non transitory computer readable medium comprising a computer program having instructions for a programmable computer system to perform computations by means of a distributed computing system that comprises a server, a group of clients, and a communication network that provides for encrypted, anonymous communication between the clients in the group of clients and from individual clients in the group of clients to a server, wherein the instructions when executed by the programmable computer system will make the programmable computer system perform operations comprising:

each of the clients in the group, referred to as a first client forming encrypted representations of limit amounts applicable to respective other clients in the group of clients in combination with the first client, using an encryption scheme to which at least initially only the first client has a decryption key, wherein the limit amounts are amounts of value;

transmitting the encrypted representations of the limit amounts applicable to the respective other clients in combination with the first client, each to a respective other client to which a limit amount is applicable;

receiving encrypted representations of limit amounts from the other clients; and forming doubly encrypted representations of the limit amounts by encrypting the encrypted representations of the limit amounts received from the other clients that are applicable to the first client that forms the doubly encrypted representations, using the encryption scheme of the first client or encryption using a public encryption key of the server;

sending a message containing a request anonymously to the server, without having an address of the first client, the message containing the decryption key of the encryption scheme of the first client and, if the doubly encrypted representations of the limit amounts are formed using the public encryption key of the server, the doubly encrypted representations of the limit amounts;

the server receiving messages from the clients in the group referred to as first clients;

performing double decryption of the doubly encrypted representations of the limit amounts, using decryption keys from pairs of the messages or, when the message contains the doubly encrypted representations of the limit amounts, using a private decryption key of the server and decryption keys from other messages;

verifying results of the double decryption, and selecting pairs of the messages with decryption keys that produce verified results; and computing a solution that satisfies requests from the messages, subject to the limit amounts from the verified results, applied in conjunction with the requests from the pairs of the messages.

10. A computer system programmed with the computer program according to claim 9.

\* \* \* \* \*